(12) United States Patent
Grandjean et al.

(10) Patent No.: US 9,821,270 B2
(45) Date of Patent: Nov. 21, 2017

(54) METHOD FOR SELECTIVE ABSORPTION OF HYDROGEN SULFIDE FROM A GASEOUS EFFLUENT BY A 1,2-BIS(2-DIMETHYLAMINOETHOXY) ETHANE-BASED ABSORBENT SOLUTION COMPRISING A VISCOSIFYING AGENT

(71) Applicant: IFP ENERGIES NOUVELLES, Rueil-Malmaison (FR)

(72) Inventors: Julien Grandjean, Lyons (FR); Dominique Le Pennec, Orgerus (FR); Bruno Delfort, Paris (FR)

(73) Assignee: IFP ENERGIES NOUVELLES, Rueil-Malmasion (FR)

( * ) Notice: Subject to any disclaimer, the term of this patent is extended or adjusted under 35 U.S.C. 154(b) by 149 days.

(21) Appl. No.: 14/651,962

(22) PCT Filed: Dec. 5, 2013

(86) PCT No.: PCT/FR2013/052960
§ 371 (c)(1),
(2) Date: Jun. 12, 2015

(87) PCT Pub. No.: WO2014/091121
PCT Pub. Date: Jun. 19, 2014

(65) Prior Publication Data
US 2015/0321144 A1  Nov. 12, 2015

(30) Foreign Application Priority Data
Dec. 13, 2012  (FR) .................................. 12 03400

(51) Int. Cl.
*B01D 53/52*  (2006.01)
*B01D 53/14*  (2006.01)
(Continued)

(52) U.S. Cl.
CPC ......... *B01D 53/78* (2013.01); *B01D 53/1468* (2013.01); *B01D 53/1493* (2013.01);
(Continued)

(58) Field of Classification Search
CPC ........ B01D 53/52; B01D 53/78; B01D 53/96; B01D 53/526; B01D 53/1456;
(Continued)

(56) References Cited

U.S. PATENT DOCUMENTS 4,405,581 A  9/1983  Savage et al.
4,405,582 A  9/1983  Stogryn et al.
(Continued)

FOREIGN PATENT DOCUMENTS

EP  0087856 A1  9/1983

OTHER PUBLICATIONS

International Search Report for International Application No. PCT/FR2013/052960 dated Mar. 28, 2014, English language.
(Continued)

*Primary Examiner* — Daniel Berns
(74) *Attorney, Agent, or Firm* — Fitch, Even, Tabin & Flannery, LLP

(57) ABSTRACT

The invention relates to a method of selectively removing hydrogen sulfide $H_2S$ from a gaseous effluent comprising at least $H_2S$ and $CO_2$, wherein a stage of selective absorption of hydrogen sulfide over $CO_2$ is carried out by contacting said effluent with a solution comprising (a) water and (b) at least the following diamine:

1,2-bis(2-dimethylaminoethoxy)ethane
(Continued)

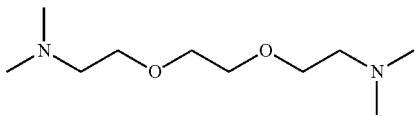

and wherein the absorption selectivity is controlled by adding (c) a viscosifying compound to the absorbent solution.

20 Claims, 2 Drawing Sheets

(51) Int. Cl.
B01D 53/78 (2006.01)
B01D 53/96 (2006.01)
C01B 3/52 (2006.01)
C10L 3/10 (2006.01)

(52) U.S. Cl.
CPC ............ *B01D 53/52* (2013.01); *C01B 3/52* (2013.01); *C10L 3/103* (2013.01); *B01D 2252/2026* (2013.01); *B01D 2252/2041* (2013.01); *B01D 2252/20484* (2013.01); *B01D 2252/602* (2013.01); *C01B 2203/0415* (2013.01); *C01B 2203/0485* (2013.01); *C10L 2290/541* (2013.01)

(58) Field of Classification Search
CPC ............ B01D 53/1462; B01D 53/1468; B01D 53/1475; B01D 53/1493; B01D 2258/05; B01D 2258/0233; B01D 2258/0283; B01D 2258/0291; B01D 2252/602; B01D 2252/2021; B01D 2252/2023; B01D 2252/2025; B01D 2252/2041; B01D 2252/2056; B01D 2252/20421; B01D 2252/20426; B01D 2252/20431; B01D 2252/20447; B01D 2252/20452; B01D 2252/20484; Y02C 10/04; Y02C 10/06
See application file for complete search history.

(56) References Cited

U.S. PATENT DOCUMENTS

| 4,483,833 A | 11/1984 | Stogryn et al. |
| 6,852,144 B1 | 2/2005 | Wagner et al. |
| 2012/0248372 A1* | 10/2012 | Bara .................. B01D 53/1456 252/184 |
| 2015/0321138 A1* | 11/2015 | Grandjean ......... B01D 53/1456 423/229 |

OTHER PUBLICATIONS

Lammers et al., Effect of Polyhydroxyalcohols on COS Absorption in Aqueous Methyldiethanolamine, The Chemical Engineering Journal 60, 1995, pp. 123-129 in English.

* cited by examiner

METHOD FOR SELECTIVE ABSORPTION OF HYDROGEN SULFIDE FROM A GASEOUS EFFLUENT BY A 1,2-BIS(2-DIMETHYLAMINOETHOXY) ETHANE-BASED ABSORBENT SOLUTION COMPRISING A VISCOSIFYING AGENT

FIELD OF THE INVENTION

The present invention relates to the field of gaseous effluent deacidizing methods. The invention is advantageously applied for treating gas of industrial origin and natural gas.

BACKGROUND OF THE INVENTION

Absorption methods using an aqueous amine solution are commonly used for removing acid compounds, notably $CO_2$, $H_2S$, COS, $CS_2$, $SO_2$ and mercaptans present in a gas. The gas is deacidized by contacting with the absorbent solution in an absorption column (absorber), then the absorbent solution is thermally regenerated in a regeneration column (regenerator). A gas depleted in acid compounds is then produced in the absorber and a gas rich in acid compounds leaves the regenerator. For example, document U.S. Pat. No. 6,852,144 describes a method of removing acid compounds from hydrocarbons. The method uses a water-N-methyldiethanolamine or water-triethanolamine absorbent solution containing a high proportion of a compound belonging to the following group: piperazine and/or methylpiperazine and/or morpholine.

One limitation of the absorbent solutions commonly used in deacidizing applications is their insufficient absorption selectivity for hydrogen sulfide ($H_2S$) over carbon dioxide ($CO_2$). In fact, in some natural gas deacidizing cases, selective $H_2S$ removal is sought by limiting to the maximum $CO_2$ absorption. This constraint is particularly important for gases to be treated that already have a $CO_2$ content less than or equal to the desired specification. A maximum $H_2S$ absorption capacity is then sought with a maximum $H_2S$ absorption selectivity over $CO_2$. This selectivity allows to recover an acid gas at the regenerator outlet having the highest $H_2S$ concentration possible, which limits the size of the sulfur chain units downstream from the treatment and guarantees better operation. In some cases, an $H_2S$ enrichment unit is necessary for concentrating the acid gas in $H_2S$. In this case, the most selective absorbent solution possible is also sought. Tail gas treatment units also require selective removal of the $H_2S$ that is sent upstream from the sulfur chain.

It is well known to the person skilled in the art that tertiary amines or secondary amines with severe steric hindrance have slower $CO_2$ capture kinetics than primary amines or little-hindered secondary amines. On the other hand, tertiary amines or secondary amines with severe steric hindrance have instantaneous $H_2S$ capture kinetics, which allows selective $H_2S$ removal based on distinct kinetic performances.

In 1950, Frazier and Kohl (Ind. and Eng. Chem., 42, 2288) notably showed that the tertiary amine N-methyldiethanolamine (MDEA) has a high $H_2S$ absorption selectivity degree over $CO_2$ due to the distinct kinetic performances of this amine on these two gases. However, there are cases where using MDEA does not allow the desired $H_2S$ absorption capacity to be reached and involves insufficient selectivity. Thus, using MDEA for treating gases with high $CO_2$ and $H_2S$ partial pressures, as it is for example the case for some natural gases, is of limited interest. This is also the case when it is desired to reduce $H_2S$ contents at low partial pressures, for example when treating refinery tail gas or syngas.

U.S. Pat. No. 4,405,581 discloses the use of absorbent solutions based on hindered secondary amines for selective removal of $H_2S$ in the presence of $CO_2$. For the same use, patent U.S. Pat. No. 4,405,582 discloses the use of absorbent solutions based on diaminoethers where at least one amine function is tertiary. U.S. Pat. No. 4,483,833 discloses the use of heterocyclic tertiary aminoalcohol and aminoetheralcohols for removing $H_2S$ from a gaseous mixture comprising $H_2S$ and $CO_2$. All these patents describe improved performances in terms of selectivity and capacity in relation to N-methyldiethanolamine.

The inventors have discovered that adding some organic compounds, notably in very low proportions, to a formulation containing water and at least one hindered tertiary or secondary amine allows to control the absorption selectivity during selective $H_2S$ absorption over $CO_2$ from a gaseous effluent comprising $H_2S$ and $CO_2$. Said organic compound, by increasing the dynamic viscosity of the aqueous solution in a controlled manner, allows to improve the $H_2S$ absorption selectivity in relation to $CO_2$. Such a compound is referred to as "viscosifying compound" in the present description.

The inventors have also discovered that hindered tertiary and secondary amines in general and tertiary diaminoethers in particular are not equivalent in terms of performances for use in absorbent formulations containing a viscosifying compound allowing controlled selective $H_2S$ absorption over $CO_2$. Surprisingly, 1,2-bis(2-dimethylaminoethoxy) ethane formulations containing a viscosifying compound distinguish themselves by their improved $H_2S$ absorption selectivity over $CO_2$ in comparison with methyldiethanolamine formulations or other hindered tertiary and secondary amines containing the same viscosifying compound. This comparison can be achieved for example by increasing by the same multiplicative factor the viscosity of the various amine solutions through viscosifier concentration adjustment, for example by adjusting in each formulation the proportion of viscosifying compound so as to increase the viscosity of each amine solution by 40%.

SUMMARY OF THE INVENTION

The object of the invention thus relates to a method of selectively removing hydrogen sulfide contained in a gaseous effluent comprising $CO_2$, wherein a stage of selective absorption of the hydrogen sulfide over the $CO_2$ is carried out by contacting said effluent with a solution comprising (a) water and (b) at least 1,2-bis(2-dimethylaminoethoxy)ethane, and wherein the absorption selectivity is controlled by adding (c) a viscosifying compound to the absorbent solution.

The absorption selectivity can be controlled by adding less than 20% by weight of absorbent solution, preferably less than 5 wt. %, more preferably less than 1 wt. % and still more preferably less than 0.3 wt. % of a viscosifying compound to the absorbent solution so as to increase the dynamic viscosity of the absorbent solution by at least 20%, preferably at least 40% and more preferably at least 80%, in relation to the same absorbent solution without said viscosifying compound.

According to the invention, the viscosifying compound can be selected from the group consisting of:

polyols and their copolymers,
polyethers and their copolymers,
ethylene oxide copolymers terminated with hydrophobic motifs attached to the ethylene oxide groups by urethane groups,
partly or totally hydrolyzed polyacrylamides and their copolymers,
polymers or copolymers comprising monomer units of acrylic, methacrylic, acrylamide, acrylonitrile, N-vinylpyridine, N-vinylpyrrolidinone, N-vinylimidazole type,
linear, substituted or branched linear polysaccharides,
and mixtures thereof.

According to an embodiment, the viscosifying compound is polyacrylamide, partly hydrolyzed or modified by a hydrophobic motif.

According to another embodiment, the viscosifying compound is a partly hydrolyzed polyvinylic alcohol or polyvinyl acetate.

According to yet another embodiment, the viscosifying compound is a polyethylene glycol.

According to the invention, the absorbent solution can comprise between 10 and 90 wt. % 1,2-bis(2-dimethylaminoethoxy)ethane (b), between 10 and 90 wt. % water (a), and between 0.01 and 20 wt. % of viscosifying compound (c).

According to an embodiment, the solution can comprise an additional amine, said additional amine being a tertiary amine such as methyldiethanolamine, or a secondary amine with two tertiary carbons at nitrogen alpha position of the secondary amine function, or a secondary amine with at least one quaternary carbon at nitrogen alpha position of the secondary amine function. In this case, the solution can contain between 10 and 90 wt. % of said additional amine, preferably between 10 and 50 wt. %, and more preferably between 10 and 30 wt. %.

The absorbent solution can also comprise a physical solvent selected from among methanol and sulfolane.

According to the invention, the selective absorption stage can be carried out at a pressure ranging between 1 bar and 120 bars, and at a temperature ranging between 20° C. and 100° C.

After the absorption stage, a gaseous effluent depleted in acid compounds and an absorbent solution laden with acid compounds can be obtained, and at least one stage of regenerating the absorbent solution laden with acid compounds is performed.

The regeneration stage can be carried out at a pressure ranging between 1 bar and 10 bars, and at a temperature ranging between 100° C. and 180° C.

The gaseous effluent can be selected from among natural gas, syngas, combustion fumes, refinery gas, acid gas from an amine unit, Claus tail gas, biomass fermentation gas, cement plant gas and incinerator fumes.

According to an embodiment of the invention, the gaseous effluent is natural gas or syngas.

BRIEF DESCRIPTION OF THE FIGURES

Other features and advantages of the invention will be clear from reading the description hereafter, with reference to the accompanying figures wherein.

DETAILED DESCRIPTION

In the present description, a "tertiary amine" is understood to be any molecule comprising one or more amine functions, and all the amine functions thereof are tertiary.

In the present description, a "hindered secondary amine" is understood to be any molecule comprising one or more amine functions and all the amine functions are hindered tertiary or secondary amines, one at least being a hindered secondary amine.

"Hindrance" of the secondary amine function relates to either the presence of at least one quaternary carbon at nitrogen alpha position of the secondary amine function, or to the presence of two tertiary carbons at $\alpha$ and $\alpha'$ position.

Method of Selective $H_2S$ Removal from a $CO_2$-Containing Gaseous Effluent

The method of selective $H_2S$ removal from a $CO_2$-containing gaseous effluent comprises a stage of absorption of the acid compounds $H_2S$ and $CO_2$ by contacting the gaseous effluent with an absorbent solution according to the invention.

Figure 1:
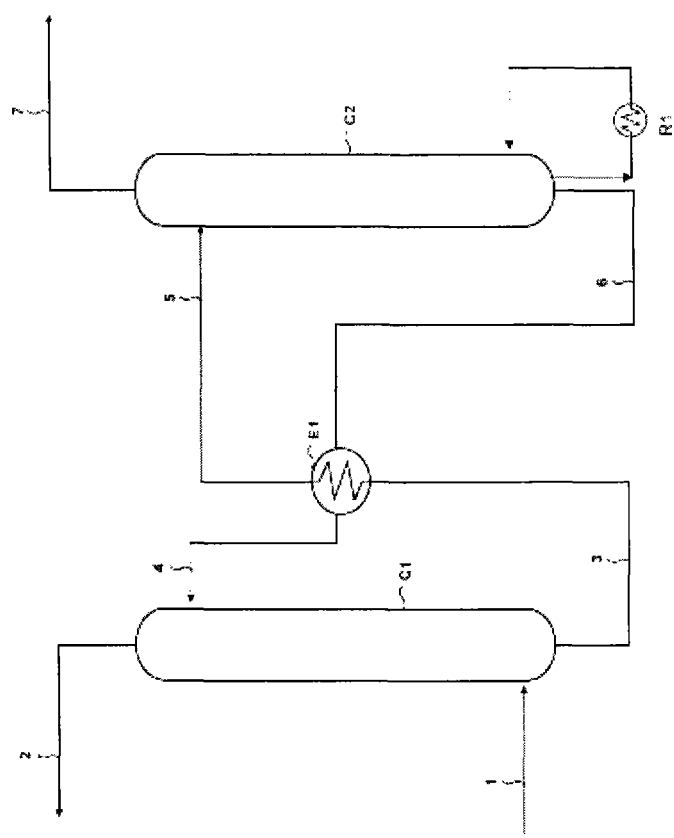
FIG. 1 shows a block diagram of a treating method for gaseous effluents comprising acid compounds, using an amine-based absorbent solution, illustrating notably the method according to the invention.

With reference to FIG. 1, the absorption stage consists in contacting gaseous effluent 1 with absorbent solution 4. Gaseous effluent 1 is fed to the bottom of C1 and the absorbent solution is fed to the top of C1. Column C1 is provided with gas-liquid contacting means, for example a random packing, a stacked packing or distillation trays. Upon contacting, the amine functions of the absorbent solution molecules react with the acid compounds contained in the effluent so as to obtain a gaseous effluent depleted in acid compounds 2, notably depleted in $H_2S$ and $CO_2$, discharged at the top of column C1, and an absorbent solution enriched in these acid compounds 3 that is discharged at the bottom of column C1, preferably in order to be regenerated.

The $H_2S$ selective absorption stage can be carried out at a pressure in absorption column C1 ranging between 1 bar and 120 bars, preferably between 20 bars and 100 bars for natural gas treatment, preferably between 1 bar and 3 bars for industrial fumes treatment, and at a temperature in absorption column C1 ranging between 20° C. and 100° C., preferably between 30° C. and 90° C., or even between 30° C. and 60° C.

The selectivity of the $H_2S$ absorption over $CO_2$ is controlled by adding a proportion of a viscosifying compound to the absorbent solution contacted with the gaseous effluent. The viscosifying compound according to the invention corresponds to any compound allowing to increase by at least 20%, preferably at least 40% and more preferably at least 80% the dynamic viscosity of an aqueous solution of a hindered tertiary or secondary amine, at a given amine concentration and temperature, the concentration of the viscosifying compound being less than 20% by weight of absorbent solution, preferably less than 5 wt. %, more preferably less than 1 wt. % and still more preferably less than 0.3 wt. %. A dynamic viscosity increase of at least 20% can be reached with less than 20% by weight of absorbent solution, preferably less than 5 wt. %, more preferably less than 1 wt. % and still more preferably less than 0.3 wt. %. The same applies to a dynamic viscosity increase of at least 40% and at least 80%, which can each be obtained with less than 20% by weight of absorbent solution, preferably less than 5 wt. %, more preferably less than 1 wt. % and still more preferably less than 0.3 wt. %.

The H₂S absorption selectivity can for example be controlled by adjusting the proportion of viscosifying compound added to the absorbent solution so as to obtain the desired selectivity for a given gas treated with a predetermined equipment.

A process simulator therefore allows to determine the dynamic viscosity needed for the regenerated solution in order to increase the selectivity so as to reach, depending on the composition of the raw gas, either the CO₂ specification limit, generally 2%, or a value as close as possible to this value considering the maximum allowable viscosity limit for the process. Once determined, the viscosity of the regenerated solution is adjusted by adding a predetermined suitable makeup proportion of a viscosifying compound according to the invention.

Using a viscosifying compound according to the invention added to the aqueous solution comprising the 1,2-bis (2-dimethylaminoethoxy)ethane according to the invention allows to obtain a higher H₂S absorption selectivity over CO₂ than the solutions of the same amine but without the viscosifying compound. The dynamic viscosity increase generated by adding the viscosifying compound according to the invention leads to a decrease in the CO₂ absorption in relation to H₂S.

Using the formulation according to the invention comprising 1,2-bis(2-dimethyl-aminoethoxy) ethane in admixture with the viscosifying compound also allows to obtain a higher H₂S absorption selectivity over CO₂ than the solutions using the same viscosifier having a comparable effect on the viscosity increase, but in admixture with other hindered tertiary or secondary amines.

The CO₂ absorption reduction, by causing a decrease in the CO₂ loading in the absorber, also allows the gas-liquid thermodynamic equilibrium to be shifted in favour of H₂S absorption. In embodiments where the H₂S absorption kinetics is weakly impacted by the liquid phase viscosity increase, on a plate column for example, it is possible to reduce the absorption column height required to reach a given H₂S specification at the absorber top. Indeed, this absorption column being conventionally sized according to the desired H₂S specification, it is possible to reduce its height if, for the same desired H₂S specification, the H₂S absorption in the column is higher. This equipment under pressure represents a large part of the investment costs of the process, which can thus be advantageously reduced.

In any case, controlled increase in the dynamic viscosity of the absorbent solution allows a notable improvement in the H₂S absorption selectivity over CO₂.

The absorption stage can be followed by a stage of regeneration of the absorbent solution enriched in acid compounds, as diagrammatically shown in FIG. 1 for example.

The regeneration stage notably consists in heating, and optionally in expanding, the absorbent solution enriched in acid compounds in order to release the acid compounds in gas form. The absorbent solution enriched in acid compounds 3 is fed into heat exchanger E1 where it is heated by stream 6 coming from regeneration column C2. Solution 5 heated at the outlet of E1 is fed into regeneration column C2.

Regeneration column C2 is equipped with gas-liquid contacting internals such as plates, random or stacked packings for example. The bottom of column C2 is provided with a reboiler R1 that provides the heat required for regeneration by vaporizing a fraction of the absorbent solution. In column C2, under the effect of contacting the absorbent solution flowing in through 5 with the vapour produced by the reboiler, the acid compounds are released in gas form and discharged at the top of C2 through line 7. Regenerated absorbent solution 6, i.e. depleted in acid compounds 6, is cooled in E1, then recycled to absorption column C1 through line 4.

The regeneration stage of the method according to the invention can be carried out by thermal regeneration, optionally complemented by one or more expansion stages.

Regeneration can be carried out at a pressure in C2 ranging between 1 and 5 bars, or even up to 10 bars, and at a temperature in C2 ranging between 100° C. and 180° C., preferably between 130° C. and 170° C. Preferably, the regeneration temperature in regeneration column C2 ranges between 155° C. and 180° C. in cases where the acid gases are intended to be reinjected. The regeneration temperature in regeneration column C2 preferably ranges between 115° C. and 130° C. in cases where the acid gas is sent to the atmosphere or to a downstream treating process such as a Claus process or a tail gas treating process.

Advantageously, the method according to the invention allows to reduce the energy requirements for regeneration of the absorbent solution insofar as the selectivity improvement reduces the proportion of CO₂ captured, the CO₂ absorption heat generally ranging between 50 and 80 kJ/mole.

Composition of the Absorbent Solution

According to the invention, the dynamic viscosity of the absorbent solution can be adjusted by adding a viscosifying compound whose concentration allows to control the process selectivity by controlling the dynamic viscosity of the absorbent solution.

The absorbent solution according to the invention comprises:
(a) water,
(b) at least the diamine 1,2-bis(2-dimethylaminoethoxy) ethane

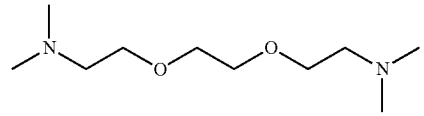

(c) one or more viscosifying compounds by means of which the H₂S absorption selectivity over CO₂ is controlled. Said viscosifying compound allows to increase by at least 20%, preferably at least 40% and more preferably at least 80% the dynamic viscosity of an aqueous solution with at least one nitrogen-containing compound (b) as described above, at a given amine concentration and temperature, the concentration of the viscosifying compound being less than 20% by weight of the absorbent solution, preferably less than 5 wt. %, more preferably less than 1 wt. % and still more preferably less than 0.3 wt. %.

Viscosifying compounds are molecules that owe their properties to particular chemical and physico-chemical structures. These properties are due to the intrinsic chemical nature of these molecules, i.e. the nature and the number of the chemical functions they consist of, as well as their position in the molecule, and also to the stereochemical character of these molecules, for example their sizes and shapes, and notably the way they spread and join together when solvated.

These compounds can be monofunctional, polyfunctional, multifunctional molecules or molecule mixtures, oligomers or polymers, linear, branched or dendritic. When these additives are polymers, their molar masses can range between several hundred daltons and several million daltons.

Their molar masses preferably range between several thousand and several million daltons, more preferably between at least 10,000 daltons and several million daltons, for example from 10,000 to 1 million daltons.

When these additives are polymers, they can consist of a single monomer or of several different monomers.

To make up the polymers, these monomers can be distributed randomly or in blocks in the polymer chains.

The monomers that make up the polymers according to the invention can carry one or more functions selected, by way of non-limitative example, from among alcohols, ethers, polyethers, acids and their salts, esters, amides, N-substituted amides, ammonium salts, amidoalkylammonium salts, phosphonium salts, amines, sulfonates, phosphonates, phosphates, carboxybetaines, sulfobetaines, phosphobetaines. The monomers can comprise linear or branched hydrocarbon chains, aromatic rings or not, heterocycles, sulfur-containing, silyl-containing or halogenated groups, notably fluorine-containing groups. The monomers can comprise groups belonging to the general carbohydrate family. The monomers can belong to the macromonomer family. The functions provided by the monomers can have the capacity to join together or to repel each other or the medium making up the solvent.

The viscosifying compounds can be selected from the group made up of the following compounds:
  polyols and their copolymers, such as glycerol and its derivatives such as diglycerols and polyglycerols, polyvinylalcohols and polyvinylalcohol copolymers, and these various polymers or copolymers can be modified by hydrophobic motifs;
  polyethers and their copolymers, such as polyethylene glycols, polypropylene glycols, ethylene oxide copolymers with other epoxyalkanes such as, for example, propylene oxide, and these various polymers or copolymers can be modified by hydrophobic motifs;
  ethylene oxide copolymers terminated with hydrophobic motifs optionally attached to the ethylene oxide groups by urethane groups;
  partly or totally hydrolyzed polyacrylamides and their copolymers, polyacrylamides modified by hydrophobic motifs, acrylamide or N-substituted acrylamide copolymers, terpolymers or multipolymers;
  polymers or copolymers comprising monomer units of acrylic, methacrylic, acrylamide, acrylonitrile, N-vinylpyridine, N-vinylpyrrolidinone, N-vinylimidazole type, and these various polymers or copolymers can be modified by hydrophobic motifs. Examples of copolymers modified by hydrophobic motifs are methacrylic acid, ethylacrylate or hydrophobic macromonomer terpolymers;
  linear, linear substituted or branched polysaccharides such as xanthane, galactomannanes (guar gum), scleroglucane or cellulose derivatives modified by hydrophilic or hydrophobic motifs. Examples of such derivatives are hydroxyethylcellulose modified by hydrophobic motifs, hydroxyethylcellulose modified by hydrophobic or hydrophilic motifs, hydroxypropylcellulose modified by hydrophobic motifs, ethylhydroxyethylcellulose modified by hydrophobic motifs.

The viscosifying compounds can be polyelectrolytes and have an anionic, cationic or zwitterionic character. The anionic character can be present through, for example, carboxylate, sulfonate, sulfate, phosphate or phosphonate functions associated with an inorganic or organic cation. The cationic character can for example be present through ammonium or phosphonium functions associated with an organic or inorganic anion. Polyelectrolytes with a zwitterionic character can include copolymers having positive and negative charges in monomer blocks separated from the skeleton or polymers or copolymers having zwitterionic monomers, i.e. carrying a positive and negative charge on the same monomer.

The viscosifying compounds can be used alone or in combination with one another.

The compounds mentioned for each family of compounds are given by way of non-limitative example and the person skilled in the art can select any other viscosifying compound (c) likely to control the $H_2S$ absorption selectivity over $CO_2$ by adding said compound to an aqueous solution containing at least one hindered tertiary or secondary amine.

In an embodiment of the invention, the viscosifying compound added to the absorbent solution is a polyacrylamide, partly hydrolyzed or modified by a hydrophobic motif. Preferably, less than 20% by weight of absorbent solution, preferably less than 5 wt. %, more preferably less than 1 wt. % and still more preferably less than 0.3 wt. % of the polyacrylamide partly hydrolyzed or modified by a hydrophobic motif is added to the absorbent solution.

According to another embodiment of the invention, the viscosifying compound added to the absorbent solution is a polyvinylic alcohol than can result from the partial or total hydrolysis of a polyvinyl acetate or a partly hydrolyzed polyvinyl acetate. Preferably, less than 20% by weight of absorbent solution, preferably less than 5 wt. %, more preferably less than 1 wt. % and still more preferably less than 0.3 wt. % of polyvinylic alcohol is added to the absorbent solution.

According to yet another embodiment of the invention, the viscosifying compound added to the absorbent solution is a polyethylene glycol. Preferably, less than 20% by weight of absorbent solution, preferably less than 5 wt. %, more preferably less than 1 wt. % and still more preferably less than 0.3 wt. % of polyethylene glycol is added to the absorbent solution.

Figure 2:
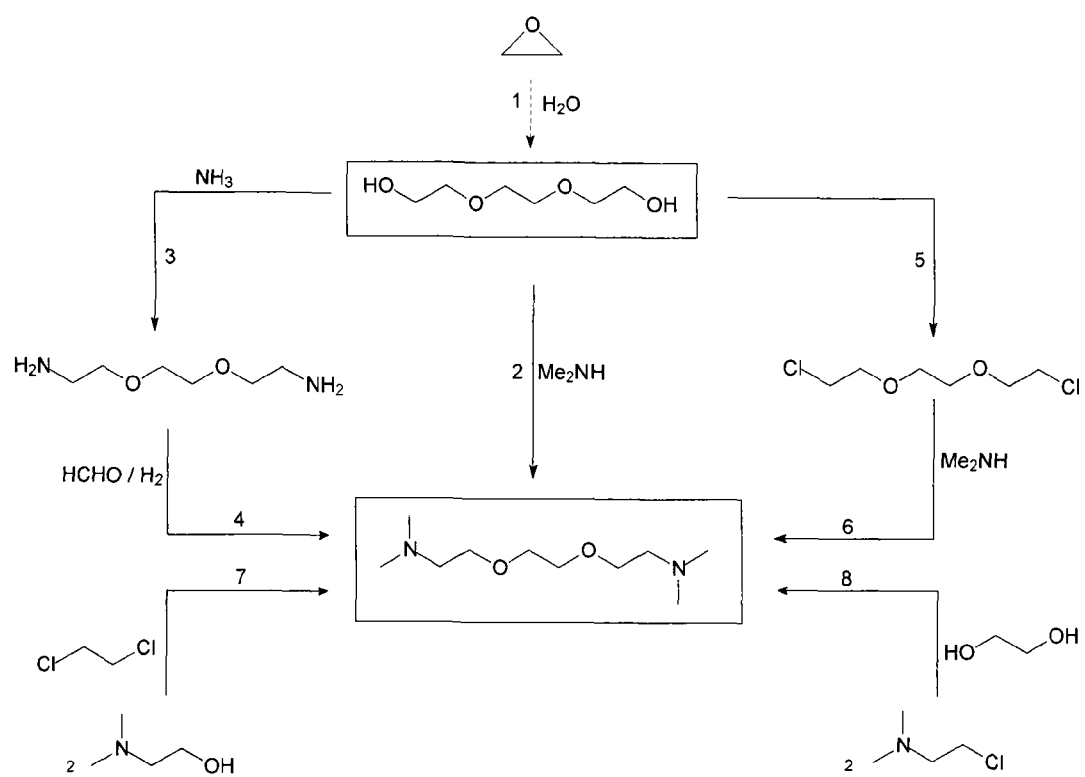
FIG. 2 illustrates 1,2-bis(2-dimethylaminoethoxy)ethane synthesis routes by way of non-exhaustive example.

The 1,2-bis(2-dimethylaminoethoxy)ethane can be prepared by means of all the synthesis routes provided by organic chemistry. FIG. 2 illustrates some of these routes by way of non-exhaustive example.

The 1,2-bis(2-dimethylaminoethoxy)ethane can be obtained by the reaction of dimethylamine on triethylene glycol according to a known condensation reaction (reaction 2). This reaction can for example be conducted in the presence of hydrogen and of a suitable catalyst under conditions widely mentioned in the literature.

Triethylene glycol, which is the precursor in this reaction, is generally obtained by trimerization of ethylene oxide according to a conventional ring opening reaction in the presence of a water molecule (reaction 1). Triethylene glycol is an abundant and inexpensive industrial compound.

The compounds meeting the general formula can also be obtained first through the reaction of ammonia on triethylene glycol according to a known condensation reaction (reaction 3) leading to 1,2-bis(2-aminoethoxy)ethane, also referred to as 1,8-diamino-3,6-dioxaoctane, the primary amine functions thereof being then N-alkylated through the reaction of formaldehyde in the presence of hydrogen and generally using a suitable catalyst (reaction 4) under conditions widely mentioned in the literature.

The compounds meeting the general formula can also be obtained first through the reaction of halogenation, for example of chlorination of the triethylene glycol to 1,2-bis(2-chloroethoxy)ethane (reaction 5) with a conventional chlorination agent such as, for example, hydrochloric acid or thionyl chloride, then through a condensation reaction (reaction 6) with dimethylamine.

The compounds meeting the general formula can also be obtained through the condensation reaction of dimethylamino-2-ethanol with a 1,2-dihalogenoethane such as 1,2-dichloroethane (reaction 7) or through the condensation reaction of a dimethylamino-2-halogenoethane such as a 2-chloro-N,N-dimethylethylamine, possibly in halogenohydrate form, with ethylene glycol (reaction 8).

According to the invention, the solution can comprise:
- between 10 and 90 wt. %, preferably between 20 and 60 wt. %, more preferably between 25 and 50 wt. % 1,2-bis(2-dimethylaminoethoxy)ethane (b),
- between 10 and 90 wt. %, preferably between 40 and 80 wt. %, more preferably between 50 and 75 wt. % water (a), and
- between 0.01 and 20 wt. % viscosifying compound (c).

According to an embodiment, the solution can comprise an additional amine, said additional amine being a tertiary amine such as methyldiethanolamine, or a secondary amine with two tertiary carbons at nitrogen alpha position of the secondary amine function, or a secondary amine with at least one quaternary carbon at nitrogen alpha position of the secondary amine function. In this case, the solution can contain between 10 and 90 wt. % of said additional amine, preferably between 10 and 50 wt. %, and more preferably between 10 and 30 wt. %.

According to the invention, the solution can comprise a physical solvent selected from among methanol and sulfolane.

Nature of the Gaseous Effluents

The absorbent solution can be used for deacidizing the following gaseous effluents: natural gas, syngas, combustion fumes, refinery gas, amine unit acid gas, Claus tail gas, biomass fermentation gas, cement plant gas and incinerator fumes. These gaseous effluents contain one or more of the following acid compounds: $CO_2$, $H_2S$, mercaptans, COS, $CS_2$, $SO_2$.

The method according to the invention can be implemented for selective removal of $H_2S$ from a syngas. Syngas contains carbon monoxide CO, hydrogen $H_2$ (generally with a $H_2$/CO ratio of 2), water vapour (generally at saturation at the absorption stage temperature) and carbon dioxide $CO_2$ (of the order of 10%). The pressure generally ranges between 20 and 30 bars, but it can reach up to 70 bars. It also comprises sulfur-containing ($H_2S$, COS, etc.), nitrogen-containing ($NH_3$, HCN) and halogenated impurities.

The method according to the invention can be implemented for selective removal of $H_2S$ from a natural gas. Natural gas predominantly consists of gaseous hydrocarbons, but it can contain some of the following acid compounds: $CO_2$, $H_2S$, mercaptans, COS, $CS_2$. The proportion of these acid compounds is very variable and it can reach up to 40% for $CO_2$ and $H_2S$. The temperature of the natural gas can range between 20° C. and 100° C. The pressure of the natural gas to be treated can range between 10 and 120 bars. The invention can be implemented to reach specifications generally imposed on the deacidized gas, i.e. 2% $CO_2$ in case of a selective application, 4 ppm $H_2S$, and 10 to 50 ppm by volume of total sulfur.

EXAMPLES

Example 1

Packed Absorber Calculation

The absorption stage of the method according to the invention is implemented for treating a natural gas whose pressure at the absorber inlet is 71.9 bars and the temperature is 31.2° C. The molar composition at the absorber inlet is as follows: 85 mol. % methane, 4.9 mol. % ethane, 1.41% propane, 0.26% isobutane, 0.59% n-butane, 0.15% isopentane, 0.30% n-pentane and 0.14% n-hexane. The gas also contains 0.09% water, 2.53% nitrogen, 2.13% $CO_2$ and 2.49% $H_2S$. The specifications for the treated gas are 2 ppmv for $H_2S$ and 2 mol. % for $CO_2$. A maximum $H_2S$ removal selectivity over $CO_2$ is thus required.

The raw gas at a flow rate of 19,927 kmol/h is brought into counter-current contact with an aqueous amine solution in an absorber filled with a stacked packing providing an interfacial area of 232 $m^2/m^3$. The temperature of the regenerated amine solution at the absorber top is 44.6° C. The absorber is modelled by 18 real plates on each of which the acid gas flows are calculated using the double film approach. An iterative calculation allows to solve the material and thermal balances plate by plate and to calculate for a given packing height the acid gas concentration and temperature profiles in the absorber.

For the reference case, the performance of a totally regenerated 46.8% MDEA solution fed to the absorber at a flow rate of 400 $Sm^3$/h is calculated.

According to the prior art, various hindered tertiary or secondary amines can be used, notably some preferred molecules whose selectivity is claimed in patents U.S. Pat. Nos. 4,405,581, 4,405,582 and 4,483,833. Their performance is compared in this case study with the reference MDEA solution. All the physico-chemical properties required for the simulation were obtained in the laboratory.

According to our invention, a 50% 1,2-bis(2-dimethylaminoethoxy)ethane concentration is maintained by increasing by 40% the viscosity thereof through the agency of a viscosifying additive according to the invention. Added in a very low proportion, preferably less than 1 wt. %, this additive increases the viscosity without modifying the liquid-vapour equilibria or the intrinsic reaction kinetics with the $CO_2$ determined in the laboratory. The only adjustment parameter of the calculation thus is the viscosity of the aqueous amine solution. For each real stage, the viscosity of the solution with viscosifier is calculated by multiplying the viscosity value of the reference solution by a factor 1.4. An inversely proportional effect of the viscosity on the diffusion coefficients in the liquid phase and the effects of the viscosity on the transfer parameters specific to the packing are also taken into account in the calculation. The same calculation is carried out for 46.8% MDEA solutions and the amine solutions according to the prior art whose concentrations are set at 50 wt. % and whose respective viscosities are increased by the same factor 1.4.

The absorber is sized by adjusting the flow rate and the packing height required to reach the desired specification of 2 ppmv $H_2S$ in the treated gas and the maximum absorption selectivity towards $H_2S$. The corresponding packing height and the $CO_2$ concentration in the treated gas are obtained for each formulation. The H₂S absorption selectivity over CO₂ is defined by the ratio of the removal efficiencies for the two gases:

$$S = \frac{\eta_{H_2S}}{\eta_{CO_2}}$$

These removal efficiencies are respectively defined by:

$$\eta_{H_2S} = 1 - \frac{F_{TreatedGas} \times y_{TreatedGas}^{H_2S}}{F_{RawGas} \times y_{RawGas}^{H_2S}} \text{ and } \eta_{CO_2} = 1 - \frac{F_{TreatedGas} \times y_{TreatedGas}^{CO_2}}{F_{RawGas} \times y_{RawGas}^{CO_2}}$$

In these expressions, F designates the molar flow rate of acid gas, raw or treated; y designates the molar fraction of acid gas, H₂S or CO₂.

Table 1 below compares the results obtained by calculation for the various 46.8 wt. % MDEA formulations, 50% amines according to the prior art, the same formulations whose viscosity is increased by a factor 1.4 and the formulation according to the invention whose viscosity is also increased by a factor 1.4 in relation to the same formulation without a viscosifying additive.

TABLE 1

| | $Y_{CO_2}$ outlet vol. % | Selectivity | Selectivity gain | Solvent flow rate (m³/h) | Packing volume (m³) |
|---|---|---|---|---|---|
| 1 - 46.8% MDEA - Reference without viscosifier | 1.62 | 3.8 | ref. | 400 | 33.9 |
| 2 - 46.8% MDEA and viscosifier Viscosity × 1.4 | 1.70 | 4.4 | 16% | 400 | 34.6 |
| 3 - 50% ter-butyl-ethanolamine according to U.S. Pat. No. 4,405,581 | 1.31 | 2.5 | −35% | 200 | 28.4 |
| 4 - 50% ter-butyl-ethanolamine and viscosifier Viscosity × 1.4 | 1.41 | 2.8 | −27% | 200 | 29.5 |
| 5 - 50% N-(2-hydroxy-ethyl) pyrolidine according to U.S. Pat. No. 4,483,833 | 0.95 | 1.8 | −54% | 250 | 28.9 |
| 6 - 50% N-(2-hydroxy-ethyl)pyrolidine and viscosifier Viscosity × 1.4 | 1.09 | 2.0 | −48% | 250 | 28.9 |
| 7 - 50% 1,2-bis(2-pyrolidino ethoxy)ethane according to U.S. Pat. No. 4,405,582 | 1.60 | 3.7 | −3% | 200 | 31.1 |
| 8 - 50% 1,2-bis(2-pyrolidino ethoxy)ethane and viscosifier Viscosity × 1.4 | 1.70 | 4.4 | 16% | 200 | 32.1 |
| 9 - 50% 1,2-bis(2-dimethylamino ethoxy)ethane according to U.S. Pat. No. 4,405,582 | 1.68 | 4.2 | 12% | 200 | 29.0 |
| 10 - 50% 1,2-bis(2-dimethylamino ethoxy)ethane and viscosifier Viscosity × 1.4 According to the invention | 1.75 | 4.9 | 30% | 200 | 30.0 |

This example illustrates the selectivity gain provided by the method according to the invention, wherein selectivity is controlled by adding a viscosifying compound whose concentration allows to adjust the viscosity of a 1,2-bis(2-dimethyl-aminoethoxy)ethane solution.

Thus, the formulation according to the invention allowing to increase by at least 40% the value of the dynamic viscosity in relation to the 1,2-bis(2-dimethylamino-ethoxy) ethane solution according to patent U.S. Pat. No. 4,405,582 allows, in this example, to increase the selectivity by at least 30% in relation to the methyldiethanolamine-based reference solution.

The same MDEA solution, to which a viscosifying compound allowing a 40% increase has also been added, shows a 16% selectivity increase, which remains below the improvement provided by the invention.

The invention also allows to reduce the flow rate of the solvent circulating in the process, this reduction reaching 50% in this example. It also allows to reduce the packing volume required to achieve the desired H₂S specification.

The selectivity gain provided by the 1,2-bis(2-dimethyl-aminoethoxy)ethane solution according to patent U.S. Pat. No. 4,405,582 (12%) is also below the gain provided by the invention and by an MDEA solution comprising a compound allowing its viscosity to be increased by 40%.

The formulation according to the invention also distinguishes itself from other diaminoether formulations according to patent U.S. Pat. No. 4,405,582, such as 1,2-bis(2-pyrolidinoethoxy)ethane for which the selectivities reached are substantially equivalent to those of the MDEA, with or without viscosifier.

It also distinguishes itself from other diaminoether formulations according to the prior art, for example the 50 wt. % ter-butylethanolamine according to patent U.S. Pat. No. 4,405,581 or the 50 wt. % N-(2-hydroxyethyl)pyrolidine according to patent U.S. Pat. No. 4,483,833. With or without viscosifier, these formulations lead to markedly lower selectivities than those obtained with MDEA and, a fortiori, those of the invention.

Implementing the method according to the invention described here thus allows to control and to improve the selectivity in an effective and unexpected manner in relation to the prior art.

Example 2

Dynamic Viscosity Measurement of a Formulation According to the Invention

The dynamic viscosity of various aqueous amine solutions is measured at 40° C. using an AMVn Anton Paar type automatic viscometer working according to the principle of Hoepler's viscometer. The viscosity is deduced from the measurement of the falling time of a ball in a 1.6 mm-diameter capillary inclined at 80° C., according to the DIN 53015 and ISO 12058 standards, and from the density measurement measured on a DMA 4100 Anton Paar densimeter at 40° C.

These measurements performed at 40° C. allow to highlight the viscosifying effect of the various compounds used according to the invention, such as the impact of this viscosifying effect on selectivity as illustrated in Example 1.

By way of example, the dynamic viscosities of a formulation according to the invention, containing 50 wt. % 1,2-bis(2-dimethylaminoethoxy)ethane (b) and 1 wt. % viscosifying compound (c), and of a solution containing 47 wt. % methyldiethanolamine (MDEA) and 1 wt. % of the same viscosifying compound are compared with those of aqueous solutions respectively containing 50 wt. % 1,2-bis(2-dimethylamino-ethoxy)ethane and 47 wt. % methyldiethanolamine (MDEA) without a viscosifying additive.

Compound (c) designated by PEG 35000 is a polyethylene glycol of weight average molar mass 35,000 g/mole.

TABLE 2

| Compound (b) | Wt. % | Compound (c) | Wt. % | Viscosity at 40° C. (mPas) | Viscosity gain (%) |
|---|---|---|---|---|---|
| MDEA | 47.0 | — | — | 4.5 | — |
| MDEA | 47.0 | PEG 35000 | 1 | 7.1 | 60 |
| 1,2-bis(2-dimethyl-aminoethoxy)ethane | 50.0 | — | — | 6.1 | — |
| 1,2-bis(2-dimethyl-aminoethoxy)ethane | 50.0 | PEG 35000 | 1 | 8.7 | 43 |

This example illustrates a compound (c) allowing to increase the viscosity of an aqueous MDEA solution or of an aqueous 1,2-bis(2-dimethylaminoethoxy)ethane solution according to the invention by at least 40% by adding less than 20% of said compound to the formulation. This effect can be observed for concentrations lower than or equal to 1 wt. % for compound PEG 35000.

Example 3

CO$_2$ Absorption Rate for a Formulation According to the Invention

A comparative CO$_2$ absorption test is carried out with an absorbent solution according to the invention containing 30 wt. % 1,2-bis(2-dimethylaminoethoxy)ethane (b) according to the invention and 6 wt. % PEG 35000, a polyethylene glycol of weight average molar mass 35,000 g/mole, a viscosifying compound according to the invention (c), in relation to:
- an aqueous solution comprising 30 wt. % 1,2-bis(2-dimethylaminoethoxy)ethane without a viscosifying compound on the one hand, and
- an N-methyldiethanolamine (MDEA) aqueous solution with 47 wt. % MDEA, which is the reference solution for selective removal in gas treatment on the other hand.

The solutions are precharged with CO$_2$ at a loading of 0.35 mole CO$_2$ per mole of amine. Prior to measuring the absorption rate, the dynamic viscosities of the CO$_2$-precharged aqueous solutions are determined, these measurements being performed at 50° C. using an AMVn Anton Paar type automatic viscometer as described in the previous example.

For each test, the CO$_2$ stream absorbed by the CO$_2$-precharged aqueous solution is measured in a closed reactor of Lewis cell type where the gas and liquid phases are perfectly stirred and separated by a plane interface. 200 g solution are fed into the closed reactor whose temperature is set at 50° C. Five successive CO$_2$ injections are carried out from 100 to 200 mbar in the vapour phase of the 200 cm$^3$-volume reactor. The gas phase and the liquid phase are stirred at 100 rpm and entirely characterized from the hydrodynamic point of view. For each injection, the CO$_2$ absorption rate is measured through pressure variation in the gas phase. A global transfer coefficient Kg is thus determined using a mean of the results obtained for the 5 injections.

The results obtained are shown in Table 3 hereafter in relative absorption rate by comparison with the N-methyldiethanolamine (MDEA) reference formulation with 47 wt. % MDEA, this relative absorption rate being defined by the ratio of the global transfer coefficient of the solvent to the global transfer coefficient of the reference formulation.

TABLE 3

| Amine | Wt. % amine | Viscosifying compound (c) | Wt. % viscosifying compound (c) | Viscosity at 50° C. (mPas) | CO$_2$ relative absorption rate at 50° C. |
|---|---|---|---|---|---|
| MDEA | 47 | — | — | 4.1 | 1.00 |
| 1,2-bis(2-dimethyl-aminoethoxy)ethane according to U.S. Pat. No. 4,405,582 | 30 | — | — | 2.0 | 1.01 |
| 1,2-bis(2-dimethyl-aminoethoxy)ethane | 30 | PEG 35000 | 6 | 13.3 | 0.75 |

These results highlight, under the test conditions, a slower CO$_2$ absorption rate with the absorbent solution according to the invention in relation to the MDEA reference formulation and to a 1,2-bis(2-dimethylaminoethoxy)ethane solution according to the prior art in coherence with the viscosity increase in comparison with the 1,2-bis(2-dimethylaminoethoxy)ethane solution without viscosifier. It thus appears that the solution according to the invention comprising a viscosifying compound, PEG 35000 here, affords particular interest and provides an improvement in the case of selective removal of hydrogen sulfide from a CO$_2$-containing gaseous effluent, wherein the CO$_2$ absorption kinetics is to be limited.

The invention claimed is:

1. A method of selectively removing hydrogen sulfide contained in a gaseous effluent comprising CO$_2$, wherein a stage of selective absorption of the hydrogen sulfide over the CO$_2$ is carried out by contacting said effluent with an absorption solution comprising (a) water and (b) at least 1,2-bis(2-dimethylaminoethoxy)ethane, and wherein the absorption selectivity is controlled by adding a proportion of a viscosifying compound (c) to said absorbent solution, wherein said viscosifying compound is a polyacrylamide, partly hydrolyzed or modified by a hydrophobic motif.

2. A method as claimed in claim 1, wheren the absorption selectivity is controlled by adding less than 20% by weight of the absorbent solution of a viscosifying compound to the absorbent solution so as to increase the dynamic viscosity of the absorbent solution by at least 20% in relation to the same absorbent solution without said viscosifying compound.

3. A method as claimed in claim 1, wherein the absorbent solution comprises between 10 and 90 wt. % 1,2-bis-(2-dimethylaminoethoxy)ethane (b), between 10 and 90 wt. % water (a), and between 0.01 and 20 wt. % of viscosifying compound (c).

4. A method as claimed in claim 1, wherein the absorbent solution also comprises a physical solvent selected from among methanol and sulfolane.

5. A method as claimed in claim 1, wherein the selective absorption stage is carried out at a pressure ranging between 1 bar and 120 bars, and at a temperature ranging between 20° C. and 100° C.

6. A method as claimed in claim 1, wherein the gaseous effluent is selected from among natural gas, syngas, combustion fumes, refinery gas, acid gas from an amine unit, Claus tail gas, biomass fermentation gas, cement plant gas and incinerator fumes.

7. A method as claimed in claim 1, wherein the gaseous effluent is natural gas or syngas.

8. A method as claimed in claim 1, wherein the absorbent solution comprises an additional amine, said additional amine being a tertiary amine a secondary amine with two tertiary carbons at nitrogen alpha position of the secondary amine function, or a secondary amine with at least one quaternary carbon at nitrogen alpha position of the secondary amine function.

9. A method as claimed in claim 8, wherein the absorbent solution comprises between 10 and 90 wt. % of said additional amine.

10. A method of seleively removing hydrogen sulfide contained in a gaseous effluent comprising $CO_2$, wherein a stage of selective absorption of the hydrogen sulfide over the $CO_2$ is carried out by contacting said effiutent with an absorbent solution comprising (a) water and (b) at least 1,2-bis(2-dimethylaminoethoxy)ethane, and wherein the absorption selectivity is controlled by adding aproportion of a viscosifying compound (c) to said absorbent solution, wherein said viscosifying compound is a partly hydrolyzed polyvinylic alcohol or polyvinyl acetate.

11. A method as claimed in claim 10, wherein the absorption selectivity is controlled by adding less than 20% by weight of the absorbent solution of a viscosifying compound to the absorbent solution so as to increase the dynamic viscosity of the absorbent solution by at least 20% in relation to the same absorbent solution without said viscosifying compound.

12. A method as claimed in claim 10, wherein the absorbent solution comprises between 10 and 90 wt. % 1,2-bis-(2-dimethylaminoethoxy)ethane (b), between 10 and 90 wt. % water (a), and between 0.01 and 20 wt. % of viscosifying compound (c).

13. A method as claimed in claim 10, wherein the absorbent solution also comprises a physical solvent selected from among methanol and sulfolane.

14. A method as claimed in claim 10, wherein the selective absorption stage is carried out at a pressure ranging between 1 bar and 120 bars, and at a temperature ranging between 20° C. and 100° C.

15. A method as claimed in claim 10, wherein the gaseous effluent is selected from among natural gas, syngas, combustion fumes, refinery gas, acid gas from an amine unit, Claus tail gas, biomass fermentation gas, cement plant gas and incinerator fumes.

16. A method as claimed in claim 10, wherein the gaseous effluent is natural gas or syngas.

17. A method as claimed in claim 10, wherein the absorbent solution comprises an additional amine, said additional amine being a tertiary amine, a secondary amine with two tertiary carbons at nitrogen alpha position of the secondary amine function, or a secondary amine with at least one quaternary carbon at nitrogen alpha position of the secondary amine function.

18. A method as claimed in claim 17, wherein the absorbent solution comprises between 10 and 90 wt. % of said additional amine.

19. A method as claimed in claim 10, wherein, after the absorption stage, a gaseous effluent depleted in acid compounds and an absorbent solution enriched in acid compounds are obtained, and wherein at least one stage of regenerating the absorbent solution laden with acid compounds is performed.

20. A method as claimed in claim 19, wherein the regeneration stage is carried out at a pressure ranging between 1 bar and 10 bars, and at a temperature ranging between 100° C. and 180° C.

* * * * *